(12) United States Patent
Tang et al.

(10) Patent No.: US 11,853,987 B2
(45) Date of Patent: *Dec. 26, 2023

(54) SYSTEM AND METHOD FOR SECURE COMMUNICATION IN A RETAIL ENVIRONMENT

(71) Applicant: Wayne Fueling Systems LLC, Austin, TX (US)

(72) Inventors: Weiming Tang, Austin, TX (US); Timothy M. Weston, Cedar Park, TX (US)

(73) Assignee: Wayne Fueling Systems LLC

( * ) Notice: Subject to any disclaimer, the term of this patent is extended or adjusted under 35 U.S.C. 154(b) by 286 days.

This patent is subject to a terminal disclaimer.

(21) Appl. No.: 16/784,804

(22) Filed: Feb. 7, 2020

(65) Prior Publication Data
US 2020/0175490 A1     Jun. 4, 2020

Related U.S. Application Data

(62) Division of application No. 11/874,807, filed on Oct. 18, 2007, now Pat. No. 10,558,961.

(51) Int. Cl.
*G06Q 20/18* (2012.01)
*H04L 9/40* (2022.01)
(Continued)

(52) U.S. Cl.
CPC ............ *G06Q 20/18* (2013.01); *G06Q 20/20* (2013.01); *G06Q 20/3823* (2013.01);
(Continued)

(58) Field of Classification Search
CPC .... G06Q 20/18; G06Q 20/20; G06Q 20/3823; H04L 63/045; H04L 63/0823; H04L 2463/102
(Continued)

(56) References Cited

U.S. PATENT DOCUMENTS

| 4,317,957 A | 3/1982 | Sendrow |
|---|---|---|
| 5,228,084 A | 7/1993 | Johnson et al. |

(Continued)

FOREIGN PATENT DOCUMENTS

| WO | WO-9609592 A1 | 3/1996 |
|---|---|---|
| WO | WO-9912136 A1 | 3/1999 |
| WO | WO-9957835 | 11/2009 |

OTHER PUBLICATIONS

Bruce Schneier, Applied Cryptography 1996, second addition, p. 32-34, 185-187, 574-577.*

(Continued)

*Primary Examiner* — Zeshan Qayyum
(74) *Attorney, Agent, or Firm* — MINTZ LEVIN COHN FERRIS GLOVSKY AND POPEO, PC (57) ABSTRACT

This disclosure provides various embodiments of systems and methods for secure communications. In one aspect, the system includes a secure payment module (SPM) in a fuel dispenser and a point-of-state (POS) system. The POS system stores a public key certificate uniquely identifying the SPM and is configured to dynamically generate a first session key. The POS system encrypts the first session key with a public key associated with the public key certificate, and transmits the encrypted first session key to the SPM. The SPM, which stores a private key associated with the public key certificate, is configured to receive and decrypt the first session key. The SPM is further configured to receive a set of magnetic card data from a card reader, encrypt the set of magnetic card data with the first session key, and transmit the encrypted set of magnetic card data to the POS system.

11 Claims, 5 Drawing Sheets

(51) Int. Cl.
G06Q 20/20 (2012.01)
G06Q 20/38 (2012.01)

(52) U.S. Cl.
CPC ........ H04L 63/045 (2013.01); H04L 63/0823 (2013.01); H04L 2463/102 (2013.01)

(58) Field of Classification Search
USPC .......................................................... 380/45
See application file for complete search history.

(56) References Cited

U.S. PATENT DOCUMENTS

| | | | |
|---|---|---|---|
| 5,423,457 A | 6/1995 | Nicholas et al. | |
| 5,671,285 A | 9/1997 | Newman | |
| 5,790,410 A | 8/1998 | Warn et al. | |
| 5,892,900 A | 4/1999 | Ginter et al. | |
| 6,185,307 B1 | 2/2001 | Johnson, Jr. | |
| 6,324,526 B1* | 11/2001 | D'Agostino | G06Q 30/0241 235/375 |
| 6,360,138 B1 | 3/2002 | Coppola et al. | |
| 6,736,313 B1 | 5/2004 | Dickson | |
| 7,047,223 B2 | 5/2006 | Watlington | |
| 7,047,558 B1* | 5/2006 | Mariana | H04L 63/0853 725/6 |
| 7,500,100 B1* | 3/2009 | Kobozev | H04L 9/3263 713/168 |
| 7,770,789 B2* | 8/2010 | Oder, II | G06Q 20/40 705/64 |
| 10,558,961 B2 | 2/2020 | Tang et al. | |
| 2002/0159084 A1 | 10/2002 | Daniels et al. | |
| 2002/0191816 A1 | 12/2002 | Maritzen et al. | |
| 2003/0028805 A1 | 2/2003 | Lahteenmaki | |
| 2003/0108205 A1 | 6/2003 | Joyner et al. | |
| 2004/0010711 A1 | 1/2004 | Tang et al. | |
| 2004/0064703 A1 | 4/2004 | Makita | |
| 2004/0153647 A1 | 8/2004 | Rotholtz et al. | |
| 2005/0001412 A1 | 1/2005 | Schneider et al. | |
| 2005/0044364 A1 | 2/2005 | Johnson, Jr. | |
| 2005/0147250 A1* | 7/2005 | Tang | G06Q 20/20 380/259 |
| 2005/0211766 A1 | 9/2005 | Robertson et al. | |
| 2006/0012479 A1 | 1/2006 | Ezra | |
| 2006/0265736 A1 | 11/2006 | Robertson et al. | |
| 2006/0294378 A1 | 12/2006 | Lumsden et al. | |
| 2007/0033398 A1 | 2/2007 | Robertson et al. | |
| 2008/0022122 A1* | 1/2008 | Parkinson | H04L 9/0662 713/185 |
| 2009/0002202 A1 | 1/2009 | Kretzler et al. | |

OTHER PUBLICATIONS

Bruce Schneier, Applied Cryptography 1996, second addition, p. 32-34, 185-187, 574-577 (Year: 1996).*

Bruce Schneier, Applied Cryptography 1996, second edition, p. 32-33.

IEEE 100 The Authoritative Dictionary of IEEE Standards Terms, Seventh Edition, 2000.

Menezes, Alfred J.; Oorschot, Paul C. Van; Vanstone, Scott A.; *Handbook of Applied Cryptography*, CRC Press, Boca Raton (1997), XP002510620; Title Page (1 page); pp. 494, 506-507, 512-514, 559 (Total 8 pages).

Notification of Transmittal Of The International Search Report And The Written Opinion Of The International Searching Authority, Or The Declaration (1 page); International Search Report (3 pages); Written Opinion Of The International Searching Authority (7 pages); all issued in PCT International Application No. PCT/US2008/079093 dated Jan. 28, 2009. (Total 11 pages).

U.S. Appl. No. 60/548,254, filed Feb. 27, 2004 and entitled "Local Zone Security Architecture for Retail Environments" (including 1 page of Provisional Patent Application Transmittal Sheet; 1 page listing additional inventors; 1 page of application cover sheet; 14 pages of Specification; 1 page of Abstract; and 6 pages of Drawings (total 24 pages).

U.S. Appl. No. 11/874,807, U.S. Pat. No. 10,558,961, filed Oct. 18, 2007, Weiming Tang et al.

* cited by examiner

SYSTEM AND METHOD FOR SECURE COMMUNICATION IN A RETAIL ENVIRONMENT

CROSS REFERENCE TO RELATED APPLICATIONS

This is a divisional of U.S. patent application Ser. No. 11/874,807 filed on Oct. 18, 2007, entitled "System and Method for Secure Communication in a Retail Environment," which is hereby referenced in its entirety.

TECHNICAL FIELD

This disclosure relates to a system and a method for secure communications in a retail environment and, more particularly, to secure communication of magnetic track data retrieved from a magnetic card.

BACKGROUND

In recent years, retail environments have faced increasing attempts of tampering and other security breaches aimed at intercepting customers' personal and financial information. Generally, the retail environment provides the customer with an interface with which to insert a payment or identification card, submitting data stored on the card's magnetic stripe, and a point-of-sale (POS) system that verifies and authenticates the information with an associated network. When a magnetic stripe card is used for these purposes, the data is typically provided from the card reader to the POS in clear text form. This allows unauthorized parties to easily intercept customer card data by tampering with the transmission line over which the information is communicated, especially if the transmission line is Ethernet or a satellite link. Once intercepted, the unauthorized parties may use the data in ways detrimental to the customer, through such means as identity theft and related misuses.

Although some systems are available to physically secure the transmission lines connecting the card reader to the POS, those same systems provide a number of limitations. In some instances, the logistics of the retail and POS systems may not allow for the transmission line to be physically secured due to environment limitations. In other instances, creating a physically secure connection between the two systems may require large amounts of time and money. A reasonable and cost-effective alternative for securing magnetic card data is not available to prevent the unauthorized interception of customers' magnetic card data communicated over the transmission line by third parties.

In typical systems, a public and private key pair may be used to secure communications between the POS and one or more of the customer interface devices. In most instances, the private key will be provided by a Root Certificate Authority ("Root CA") and stored at the POS system. Each customer interface device may then be provided the associated public key. Depending on the implementation, each customer interface device may or may not store a trusted Root CA public key certificate. In order for this common solution to efficiently work with more than one vendor's POS servers, all vendors are required to use the same Root CA.

Advances in retail environments have resulted in secure payment modules (SPMs) having enhanced tamper-resistant and/or tamper-sensitive capabilities. For instance, when some advanced SPMs detect an attempt at unauthorized access, the cryptographical or other sensitive information stored at the SPM may be deleted or otherwise protected. Whereas previous retail environments made storage of private or sensitive information at the SPM extremely vulnerable to unauthorized parties, advanced SPMs provide a higher level of security allowing for the sensitive information to be stored in the module.

SUMMARY

This disclosure provides various embodiments of systems and methods for secure communications in a fueling environment. In one aspect, the system includes a first secure payment module (SPM) and a point-of-sale (POS) system. The POS system stores a first public key certificate uniquely identifying the first SPM, is communicably coupled to the first SPM, and is configured to dynamically generate a first session key. Dynamically generating the first session key may comprise using, at least in part, pseudorandom POS system entropy data. In some instances, the first public key certificate may be issued by a trusted certificate authority. The POS system is further configured to encrypt the first session key with a first public key associated with the first public key certificate, and transmits the encrypted first session key to the first SPM. The first SPM, which stores a first private key associated with the first public key certificate, is configured to receive the encrypted first session key from the POS system and use the first private key to decrypt the first session key. The first SPM is further configured to receive a first set of sensitive data from a first card reader, encrypt the first set of sensitive data with the first session key, and transmit the encrypted first set of sensitive data to the POS system. The set of sensitive data may comprise magnetic card data in some implementations. In some instances, the POS system may be configured to receive and decrypt the encrypted first set of sensitive data with the first session key. Additionally, the POS system may be further configured to dynamically generate a second session key, encrypt the second session key with the first public key, and transmit the encrypted second session key to the first SPM. In one example, a second SPM may be communicably coupled to the POS system.

Some or all of these aspects may be further included in respective systems or other devices for executing, implementing, or otherwise supporting suitable secure communications. The details of one or more embodiments of the present disclosure are set forth in the accompanying drawings and the description below. Other features, objects, and advantages of the present disclosure will be apparent from the description and drawings, and from the claims.

DETAILED DESCRIPTION

Figure 1:
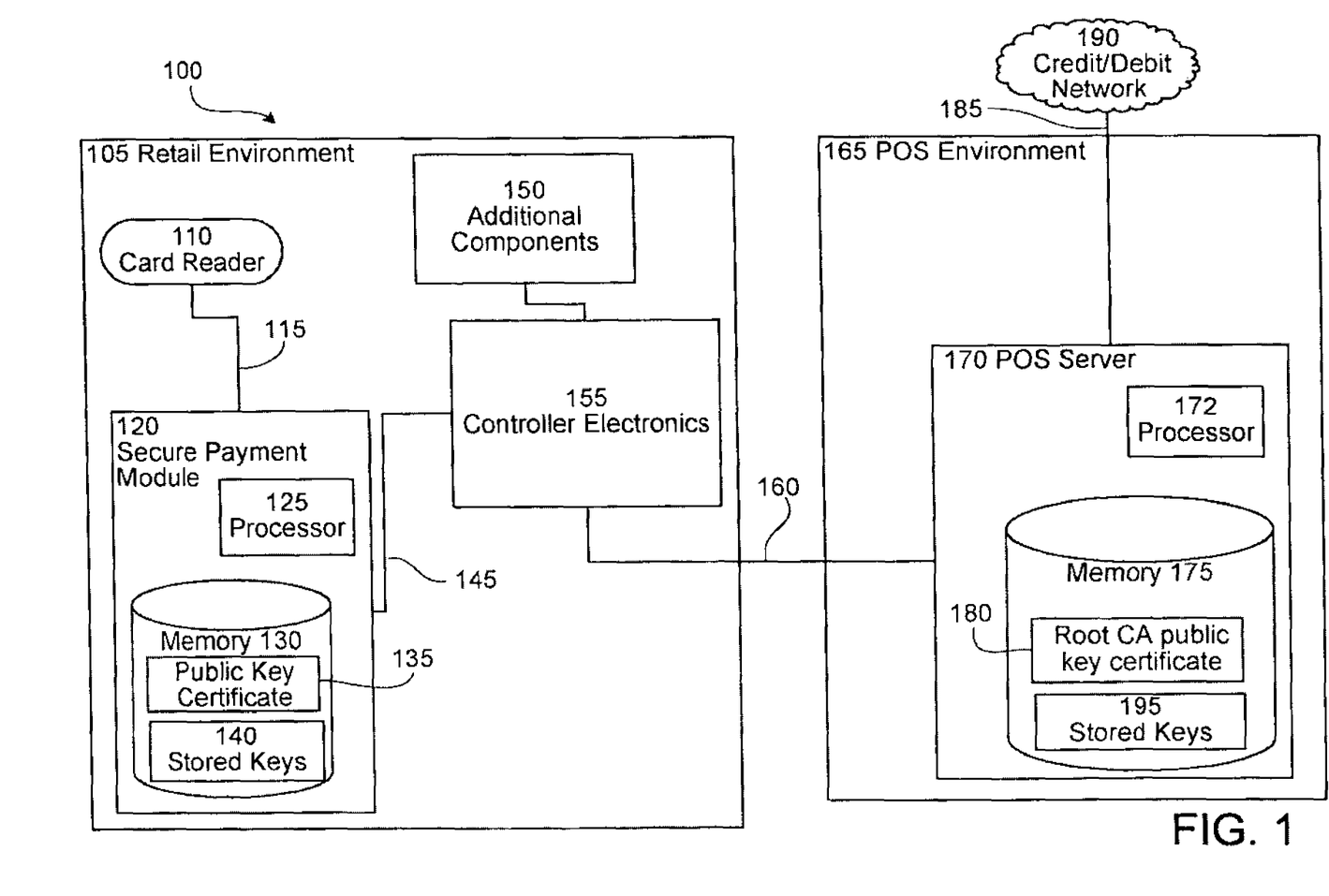
FIG. 1 is a block diagram illustrating a basic system architecture for a retail environment implementing one embodiment of the present disclosure.

FIG. 1 illustrates one embodiment of the basic system architecture for a retail environment 105 connected to a point-of-sale (POS) environment 165. System 100 includes the retail environment 105, the POS environment 165, a communication line 160 between the retail environment's 105 secure payment module (SPM) 120 and the POS environment's 165 POS server 170, and a credit/debit network 190. The system 100 may be implemented as a fueling environment, an automated teller machine (ATM), or other unattended payment terminals such as a kiosk or vending machine capable of accepting customer cards utilizing magnetic stripe data. In some instances the system 100 may also be capable of processing transactions for goods and services using a plurality of other payment and information submission methods, such as smart cards, cash, barcode-based cards, or payment cards with integrated radio frequency identification (RFID) capabilities that allow the card to wirelessly transmit customer information to the card reader, as well as other known methods. Regardless of the particular additional features, system 100 provides a card reader 110 for retrieving magnetic card data from a customer's card. 'To better protect the magnetic card data from unauthorized parties attempting to intercept customers' personal or financial information, a method for secure communications within system 100 is disclosed such that the customer information retrieved from the card's magnetic stripe may be safely communicated through the system 100, from the card reader 110 to the credit/debit network 190.

In the particular embodiment of FIG. 1, the retail environment 105 is comprised of the card reader 110, the SPM 120, a set of controller electronics 155, a set of additional components 150, a communication line 115 connecting the card reader 110 and the SPM 120, and a communication line 145 connecting the SPM 120 and the controller electronics 155. While not shown in FIG. 1, other embodiments of the system 100 may include more than one retail environment 105, each retail environment 105 having similar features to the example retail environment 105 illustrated in FIG. 1. For instance, a fueling environment may include more than one fuel dispenser wherein each dispenser may be separate from the others such that each fuel dispenser may include its own card reader 110, SPM 120, and controller electronics 155, as well as the other components of example retail environment 105 as shown in FIG. 1. Additionally, each retail environment 105 may embody one or more card readers 110, SPMs 120, and controller electronics 155 to allow more than one customer to interact with the retail environment 105 simultaneously.

Returning to illustrated FIG. 1, in transactions involving customer cards with magnetic stripe data, the customer interfaces with the retail environment 105 at the card reader 110. The card reader 110 retrieves the card's magnetic data by accessing the personal and financial information stored in the magnetic stripe integral to the customer card. Cards commonly using magnetic stripes to store data include credit cards, debit cards, driver licenses, telephone calling cards, and gift cards, among others. The magnetic stripe may be read by physical contact with the card reader 110, such as swiping the stripe past a specific component, referred to as the read head, to read and retrieve the data. In some instances, the programming of the card reader 110 may cause the card to be read in a forward direction in a simple data format, while in other instances, the programming may be complex enough to read the card in any direction with a corresponding encoding format. In some instances, the card reader 110 may also be capable of retrieving information from an integrated circuit card (ICC), as well as other cards using non-magnetic stripe methods to store information. The card reader 110 may be a general-purpose computer that is programmed to perform the specific task of reading the data stored on a magnetic stripe card. In some instances the card reader 111 may be controlled by other components of the retail environment 105, such as the controller electronics 155, while in other instances the card reader 110 may be controlled by the POS server 170. Additionally, the card reader 110 may be physically secured through a tamper-resistant and/or tamper-sensitive enclosure that allows the card reader 110 to be protected from physical intrusion by unauthorized parties. Regardless of its particular specifications, the card reader 110 is capable of retrieving information from a customer's card that is inserted for a specific purpose, such as paying for goods or services or identifying the customer to the retail environment 105.

Information received at the card reader 110 is transmitted to the SPM 120 via communication line 115. Communication line 115 facilitates wireless or wireline communication between the card reader 110 and the SPM 120. In some instances, the communication line 115 may be implemented as a universal serial bus (USB) connection, while in other instances, the communication line 115 may be an RS-232 serial connection using RJ-45 plugs and jacks, or any other suitable connection. The card reader 110 may act as a slave to a processor 125 of the SPM 120, wherein the card reader 110 provides the processor 125 with data received from the customer's card. In some instances, the connection between the card reader 110 and the SPM 120 may be physically secured in a tamper-resistant and/or tamper-sensitive enclosure. Additionally, sensitive data from the card reader 110 may be encrypted prior to transmission to the SPM 120. The SPM 120, using the processor 125, and the card reader 110 may authenticate each other prior to exchanging information, such as by performing a two-way challenge authentication procedure. Once trust is established, sensitive data (e.g. magnetic card data, PiNs for smart card transactions, etc.) received at the card reader 110 may be sent to the SPM 120 in an encrypted format.

The SPM 120 provides a tamper-resistant and/or tamper-sensitive enclosure for storing sensitive cryptographical data relevant to providing secure communications between the retail environment 105 and the POS environment 165. The SPM 120 of system 100 contains the processor 125 and a memory 130. In some instances, the memory 130 may be located on and/or a physical part of the processor 125. The processor 125 executes instructions and manipulates data to perform the operations of the SPM 120. Although described as a single processor in SPM 120, multiple processors 125 may be used according to particular needs, and references to processor 125 are meant to include multiple processors where applicable. In certain embodiments, processor 125 executes the encryption and decryption operations for data received at the SPM 120. Examples of the data received at the SPM 120 may include magnetic card data from the card reader 110 as well as communications from the controller electronics 155 forwarded for encryption or decryption. In order to encrypt and decrypt the data, the processor 125 accesses a set of stored cryptographic keys 140 within the memory 130.

Memory 130 may include any memory or database module and may take the form of volatile or non-volatile memory including, without limitation, magnetic media, optical media, random access memory (RAM), read-only memory (ROM), removable media, or any other suitable local or remote memory component. For example, memory 130 may store public and private key pairs, symmetric keys, public key certificates, applications, backup data, or other information that includes any cryptographical data, parameters, variables, algorithms instructions, rules, or references thereto. The memory 130 may also include any other appropriate data for proper operation of the processor 125 and the SPM 120 in general.

Specifically, memory 130 contains a public key certificate 135 and a set of stored keys 140. Both the public key certificate 135 and the stored keys 140 may be related to a public key infrastructure (PKI) associated with each SPM 120. SPMs 120 in other environments may have their own unique PKI such that each SPM 120 may be uniquely identified by its public key certificate 135. In general, a PKI is an arrangement that provides for trusted third party vetting of, and vouching for, component and user identities. A certificate is an electronic document used to identify a component or some other entity and associate that identity with a public key. Certificates may be provided by a certificate authority (CA), an entity that validates identities and issues certificates. CAs may be independent third parties, or they may be organizations running their own certificate-issuing server software, such as Netscape Certificate Server, Microsoft Server 2003, or Novell Certificate Server. The certificate issued by the CA binds a particular public key to the entity that the certificate identifies, such that the public key bound to the certificate will correspond to a private key provided to the entity identified by the certificate. In some instances the public key certificate 135 may include the name of the component the certificate identifies, the certificate's expiration date, the name of issuing CA, the certificate's serial number, and other related information. Additionally, the public key certificate 135 may include a digital signature of the issuing CA. The digital signature allows the certificate to authenticate to other components that the entity associated with the digital signature may be trusted. In some instances, the digital signature is created at the CA through the use of a hash function and encryption using the CA's private key, although other methods are known. In some instances, CAs may generate one digital signature to use with all issued certificates, allowing the digital signature signifying the CA to be consistent across the CA's certificate hierarchy.

Other components or entities attempting to authenticate the component with the public key certificate 135 may have a collection of trusted CA certificates with which to compare the public key certificate 135 for authenticity. The trusted CA certificates. which may include the Root CA certificate or a sub-CA public key certificate, determine which certificates the component may validate, or in other words, which issuers of certificates the component may trust. A sub-CA public key certificate may be used in a certificate chain, allowing sub-CA's verified by the Root CA (or a Root CA certificate) to issue sub-CA certificates that may be chain validated back to the Root CA itself. If the other components have a copy of the Root CA public key certificate or a common sub-CA certificate, then the other components may authenticate the public key certificate 135 issued by that CA. Authentication is provided through a comparison of the digital signature included with the Root CA or common sub-CA public key certificate and the digital signature included with the public key certificate 135 of the component being authenticated. Based on the trust model, if the digital signature of the public key certificate 135 is authenticated by a comparison to the Root CA or common sub-CA public key certificate of the trusted CA, then the component publishing the public key certificate 135 may also be trusted. Once trust is established, the other components may confidently use the public key associated with the certificate 135 to encrypt data being sent to the component identified by the certificate 135. When the data is received at the component, the data may be decrypted using the private key issued by the CA or sub-CA corresponding to the public key certificate 135. Returning to the specific embodiment of FIG. 1, the private key may be stored with the set of stored keys 140 where the private key, along with other sensitive cryptographical information, may be kept secret to ensure that communications within the system 100 remain secure. The stored keys 140 may include other keys providing for secure communications with the other components within the system 100, such as keys for encrypting and decrypting communications between the card reader 110 and the SPM 120.

Controller electronics 155 are the main electronics controlling the operations of the retail environment 105. The controller electronics 155 may control the other components within the retail environment 105, including the SPM 120, the card reader 110, and any additional components 150 included therein. In one instance, the controller electronics 155 may be a Controller Electronics developed by the Wayne business Un it of Dresser, Inc. for use in fueling environments. Some examples of the additional components 150 that may be controlled by the controller electronics 155 include displays, keypads, barcode scanners, receipt printers, soft keys, biometric devices, and other components common to retail environments. The controller electronics 155 are connected to the SPM 120 by communication line 145. In some instances, communication line 145 may be a USB connection between the two components, is well as any other suitable connection. The controller electronics 155 may also direct communication between the retail environment 105 and the POS environment 165 over the communication line 160. In some instances, communication line 160 may be embodied by an RS-485 serial connection, an Ethernet connection, or any other suitable method of communication. Due to the security benefits inherent in hard-line communications, a physical connection between the two locations may provide the most security. However, in some embodiments, the communication line 160 may be a wireless communication link used to transfer data between the retail 105 and POS environment 165.

Although the controller electronics 155 communicate with the POS server 170, the controller electronics 155 may operate to report and forward security-related information, such as encrypted data, to the SPM 120 for processing. In one instance, security-related data received by the controller electronics 155 may be delivered to the SPM 120 for decryption, decrypted by the SPM 120 using the stored keys, and the decrypted data returned to the controller electronics 155 for analysis and execution. In other instances where the controller electronics 155 are to deliver secure data to the OS server 170, the data is first provided to the SPM 120, where the data is encrypted using the cryptographical information of the stored keys 140, and subsequently returned to the controller electronics 155 for secure communication to the POS server 170. In this manner, the SPM 120 provides security for data at the retail environment 105.

As described, data from the controller electronics 155 is communicated to the POS environment 165 over the communication line 160. The POS environment 165, which includes the POS server 170, may function to authorize customer transactions, for example, fueling in a fueling environment or ATM transactions at an ATM machine or bank. The POS server 170 is the main controller (or computer) that controls and coordinates the activities of the POS environment 165. In some embodiments, more than one POS server 170 may be present within the POS environment 165. The POS server 170 includes memory 175, as well as one or more processors 172, and comprises an electronic computing device operable to receive, transmit, process, store, or manage data associated with the system. Generally, this disclosure provides merely one example of computers that may be used with the disclosure. As used in this document, the term "computer" is intended to encompass any suitable processing device. For example, POS server 170 may be implemented using computers other than servers, as well as a server pool. Indeed, POS server 170 may be adapted to execute any operating system including Linux, UNIX, Windows Server or any other suitable operating system. According to one embodiment, POS server 170 may also include or be communicably coupled with a web server and/or a mail server.

Illustrated POS server 170 includes processor 172. The processor 172 executes instructions and manipulates data to perform the operations of the associated server such as, for example, a central processing unit (CPU), a blade, an application specific integrated circuit (ASIC), or a field-programmable gate array (FPGA). Although described as a single processor in POS server 170, multiple processors 172 may be used according to particular needs and references to processor 172 are meant to include multiple processors where applicable. In certain embodiments, processor 172 executes the applications that operate the POS environment 165.

Memory 175 may include any memory or database module and may take the form of volatile or non-volatile memory including, without limitation, magnetic media, optical media, RAM, ROM, removable media, or any other suitable local or remote memory component. Similar to memory 130 of the SPM 120, memory 175 may store public keys, symmetric keys, public key certificates, applications, backup data, or other information that includes any cryptographical data, parameters, variables, algorithms, instructions, rules, or references thereto. Specifically in FIG. 1, memory 175 includes a copy of the Root CA (or sub-CA) public key certificate 180 and a set of stored keys 195. As described above, the Root CA (or sub-CA) public key certificate 180 may be created by a trusted CA to allow for authentication of certificates issued to other components and entities by the CA. Using the digital signature included on the Root CA (or sub-CA) public key certificate 180, certificates claiming to be issued by the same CA may be authenticated. If the digital signature on the certificate matches the digital signature included with the Root CA (or sub-CA) public key certificate 180, then the certificate and corresponding component may be considered authenticated. In some instances, the Root CA (or sub-CA) public key certificate 180 may be maintained by a first party associated with the SPM 120 of the retail environment 105, delivered by the first party to a second party in charge of the POS environment 165, and stored in memory 175 by the second party upon receipt of the certificate. Other methods of distribution may also be used to deliver the Root CA (or sub-CA) public key certificate 180 to the POS server 170, such as manual updates by the operator of the POS environment 165 to each POS server 170. In addition to the Root CA (or sub-CA) public key certificate 180, memory 175 includes the set of stored keys 195. The set of stored keys 195 may include keys used with secure communications throughout the system 100. For instance, a session key generated for enhanced communication with the controller electronics 155 may be stored with the set of stored keys 195. Other cryptographic keys used during the operations of the POS server 170 may also be stored therein.

The POS environment 165, and specifically the POS server 170, may be communicably coupled, via communication line 185, to a credit/debit network 190 to allow for authentication of customers' payment information with the appropriate authority, such as Visa or MasterCard. In some instances, the POS environment 165 may also be communicably coupled to the other networks, such as state agencies, for authentication of customers' personal information when the data received at the retail environment 105 represents data from driver's licenses or other identification cards. Standard methods of communication with the remote networks may be used to process the customer transactions at the retail environment 105 or at the POS server 170. Suitable embodiments of the communication line 185 include Ethernet, dial-up connections, and satellite communication, among others.

Figure 2A:
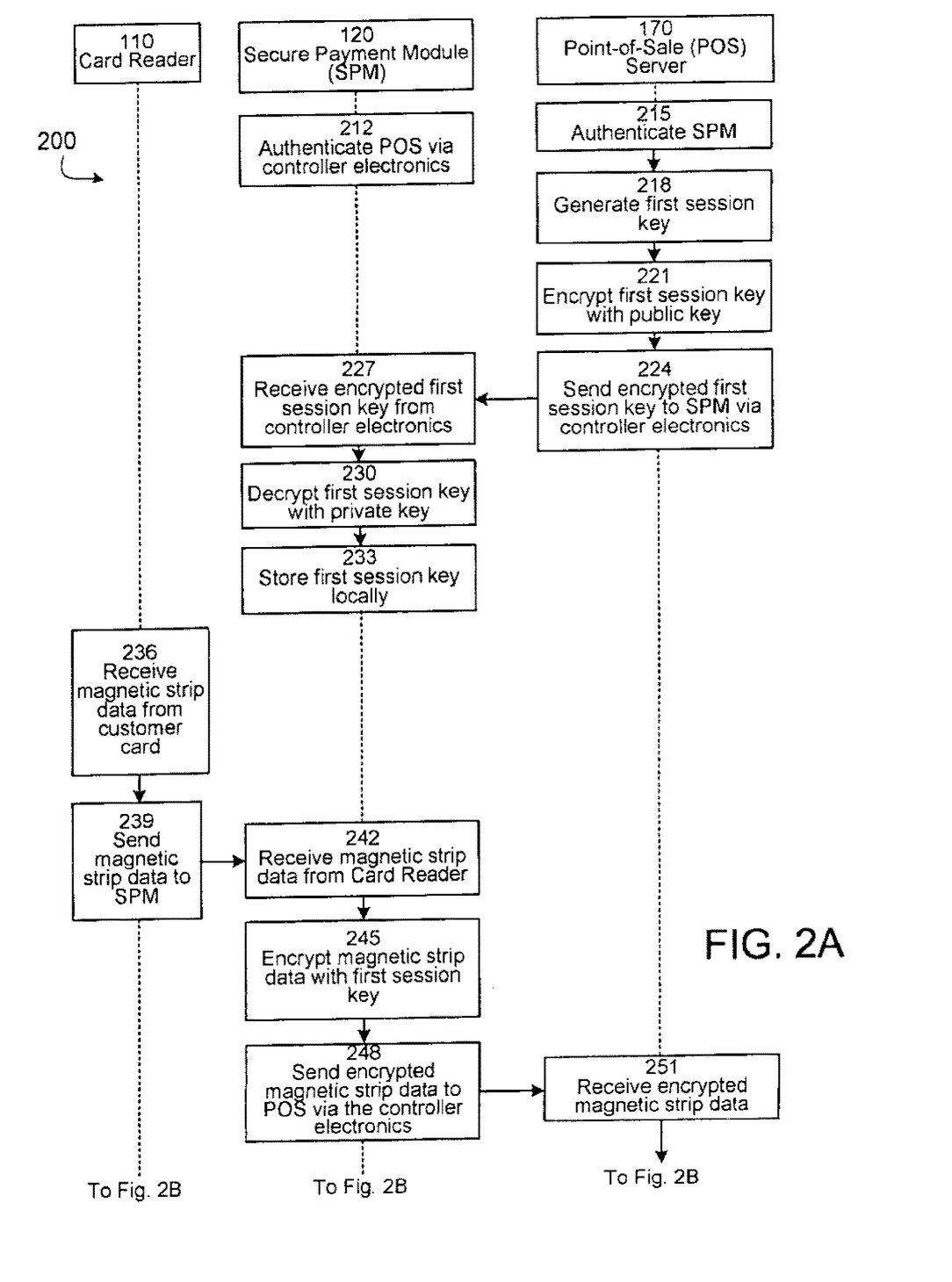
FIGS. 2A and 2B are a sequence diagram for a method establishing secure communications between the secure payment module (SPM) and the point-of-sale (POS) within the illustrated embodiment of FIG. 1.
Figure 2B:
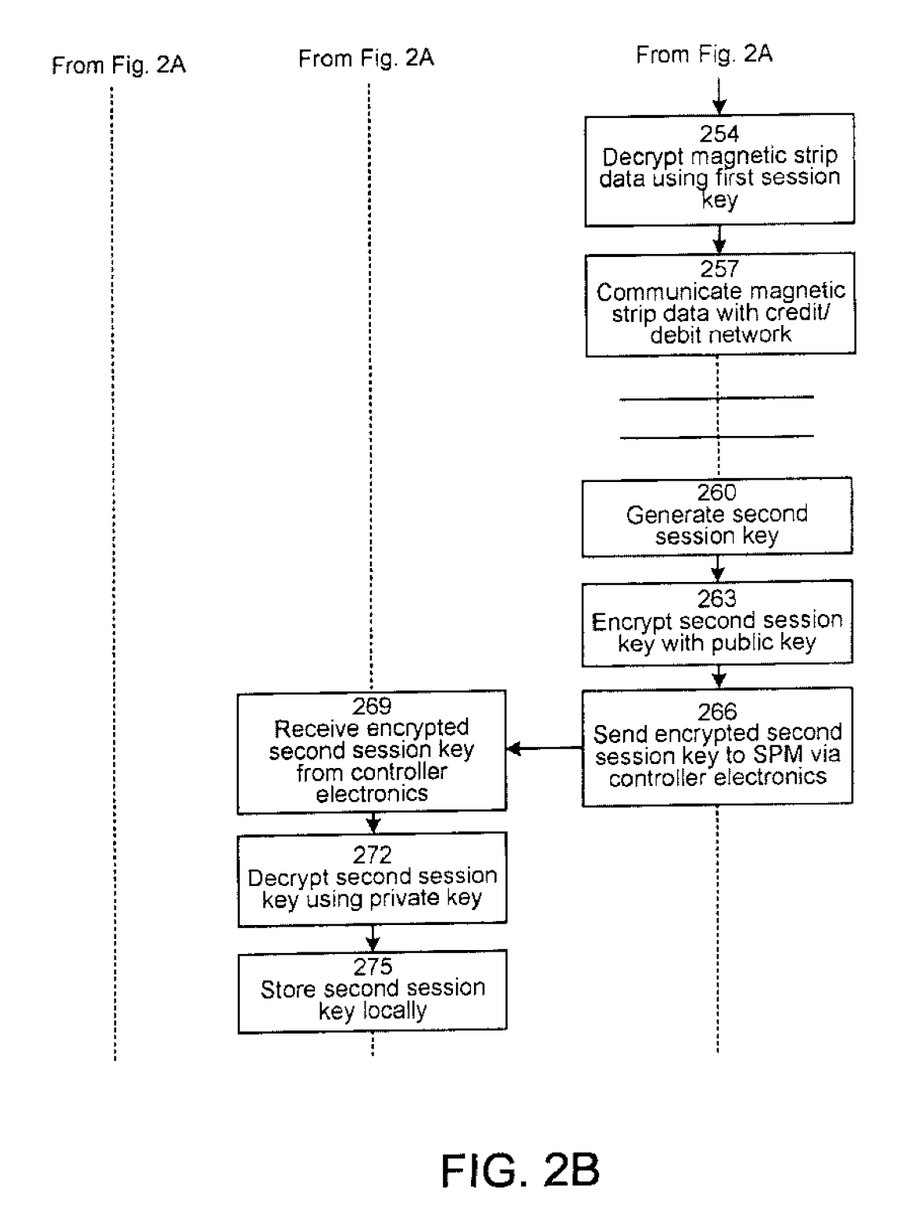

FIGS. 2A and 2B illustrate a sequence diagram for a process 200 establishing secure communications for magnetic card data received at the card reader 110 and transmitted to the POS server 170. Before any card data is sent, the SPM 120 and the POS server 170 may authenticate each other using common authentication methods at steps 212 and 215. At step 212, the SPM 120 may authenticate the POS server 170 through common authentication techniques via the connection 160 between the POS server 170 and the controller electronics 155. In one instance, a pre-agreed password hash value associated with the public key certificate may be stored in memory 130 of the SPM 120. At runtime, the controller electronics 155 may challenge the POS server 170 for authentication. When the POS server 170 receives the challenge, the POS server 170 may report the password hash value associated with the public key certificate in encrypted format, to the controller electronics 155. That encrypted password may then be forwarded to the SPM 120 from the controller electronics 155 and compared with the password hash value stored at the SPM 120. If the values are identical, then the POS server 170 may be considered authenticated. In another instance, the POS server 170 startup routine may be pre-signed by a public certificate that is signed by the Root CA or a sub-CA of the Root CA. When the POS server 170 performs its startup routine, the controller electronics 155 may retrieve the POS server's 170 public certificate containing a digital certificate of the signer of the certificate. The controller electronics 155 may verify the POS server 170 by retrieving a trusted CA certificate related to the SPM 120 and comparing its information with that of the POS server's 170 certificate. If the information matches, the POS server 170 may be verified and considered authenticated.

At step 215, the POS server 170 authenticates the SPM 120. Prior to authentication, the POS server 170 receives and stores a copy of the Root CA (or sub-CA) public key certificate 180 self-signed by the Root CA (or signed by the sub-CA). Additionally, the SPM 120 receives a unique public key certificate 135 issued by the Root CA (or sub-CA) specifically for the SPM 120. Along with other information the public key certificate 135 includes the digital signature of the Root CA (or sub-CA). To authenticate the SPM 120, the POS server 170 compares the digital signature of the CA found in the Root CA (or sub-CA) public key certificate 180 to the digital signature included in the public key certificate 135 published by the SPM 120. If the values are identical, then the POS server 170 may consider the SPM 120 trusted and authorize secure communications with the component. Due to the design of system 100, communications between the SPM 120 and the POS server 170 may be performed via the controller electronics 155. In some instances, the SPM 120 delivers information to and receives information from the controller electronics 155. Thus, the system 100 may use the controller electronics 155 as an intermediary facilitating secure communications between the SPM 120 and the POS server 170. In addition, the authentication techniques of steps 212 and 215 may be performed once at runtime, prior to each transaction, and/or periodically during operation of the system 100. By authenticating the components on a regular basis, the system 100 may ensure that any communications between the components are continuously secure.

Once the components have been sufficiently authenticated, the POS server 170 generates a first session key. The POS server 170 may generate a random session key for encrypting data between itself and the SPM 120 via the controller electronics 155. Because the session key may be generated independently at the POS server 170, no special session key generation algorithm may be required. Thus, system 100 is not restricted to any pre-agreed session key generation algorithm. In some instances, the POS server 170 may generate a random session key by use of a random number generator (RNG) or pseudorandom number generator (PRNG), the latter being a computer algorithm that produces data which appears random under analysis. The PRNGs may use system entropy to seed data, using the randomness of system conditions to increase the difficulty attackers may face in attempting to derive the initial conditions that generated the session key. Thus, the SPM 120 does not need to know how the session key was generated. In effect, session key generation may be an isolated method occurring solely in the POS environment 165. Storing the first session key with the set of stored keys 195 in memory 175 may be a part of the session key generation at step 218. In this way, the session key may be used later to encrypt data to be sent to aid decrypt data received from the retail environment 105.

Once generated, the POS server 170 encrypts the first session key using the public key included with the public key certificate 135 published by and retrieved from the SPM 120 at step 221. Having already authenticated the identity of the SPM 120 at step 215, the POS server 170 may trust that the SPM 120 has the private key corresponding to the public key certificate 135. Thus, the encrypted session key may be sent to the SPM 120 via the controller electronics 155 at step 224. By encrypting the session key with the public key, the session key is resistant to interception by unauthorized parties even where the communication line 160 has been tampered with or compromised. Only entities with the corresponding private key will be able to decrypt the session key. Because the private key is secured within the SPM 120 only the SPM 120 has access to the correct private key. In some examples, the SPM 120 may use the private key exclusively to decrypt the session keys received from the POS server 170 such that the private key is not used to encrypt magnetic card data. In those examples, the SPM 120 relies upon the current session key to encrypt sensitive communications.

At step 227, the SPM 120 receives the encrypted first session key from the controller electronics 155. As described, communications between the retail environment 105 and the POS environment 165 may occur between the controller electronics 155 and the POS server 170. Thus, the controller electronics 155 initially receive the data from the POS server 170, subsequently forwarding the encrypted session key to the SPM 120. Using the private key located with the stored keys 140, the SPM 120 decrypts the session key at step 230. Upon successful decryption, the SPM 120 may store the first session key in the set of stored keys 140 at step 233. Once the session key is established at both the SPM 120 and the POS server 170, the components may wait for a customer transaction to begin at retail environment 105.

At step 236, a customer uses a card having magnetic stripe data in a transaction at the card reader 110. Using the reader head, the card reader 110 reads and retrieves the personal or payment information from the magnetic stripe. In some instances, the card reader 110 may encrypt the magnetic stripe data prior to sending the data to the SIM 120. In other instances, the communication line 115 between the card reader 110 and SPM 120 may be physically secured such that encryption may not be necessary between the card reader 110 and the SPM 120 to sufficiently protect the transmission. In either instance, the card reader 110 sends the data to the SPM 120 at step 239.

At step 242, the SPM 120 receives the magnetic stripe data from the card reader 110. If the data was previously encrypted at the card reader 110, the SPM 120 may use a corresponding key from the set of stored keys 140 to decrypt the magnetic stripe data. At step 245, the SPM 120 encrypts the magnetic stripe data with the session key received from the POS server 170. Thus, the magnetic card data may be encrypted and secured prior to its transmission out of the secured retail environment 105 across communication line 160. Once the SPM 120 completes the encryption process, the encrypted magnetic card data is sent to the POS server 170. As described, the encrypted data may first be delivered to the controller electronics 155, and then communicated to the POS server 170 through appropriate operations of the controller electronics 155.

At step 251, the POS server 170 receives the encrypted magnetic card data sent from the SPM 120. At step 254, the data is decrypted using the first session key generated by the POS server 170. Once decrypted, the data may be communicated to the credit/debit network 190, or another connected network depending on the information retrieved at the card reader 10, for authorization and further processing at step 257. Communications between the POS server 170 and the credit/debit network 190 (or other authorization) network may be encrypted using common techniques so that the data is kept secure.

In order to ensure that a symmetric key, such as the first session key generated by the POS server 170, remains secure, it may be desirable to refresh the current session key at periodic intervals. For instance, after a certain number of transactions, the POS server 170 may generate a second session key at step 260 to replace the first session key. Refreshment of the session key may also occur after a set amount of time has elapsed, or upon startup of either component. At step 260, the POS server 170 may generate a second session key using a process similar to that of step 218. Once a new session key has been generated, that key may overwrite the first session key stored in the set of stored keys 195. In some instances, the second session key may not overwrite the first session key, but rather be stored in a new location in the set of stored keys 195. In those instances, the first session key may be kept with the set of stored keys 195 until the second session key is fully propagated through the system 100 and communications using the first session key are complete. Once the first session key no longer corresponds to communications in the system 100, it may be safely removed from the set of stored keys 195. At step 263, the POS server 170 may encrypt the second session key with the public key included with the public key certificate 135 of the SPM 120. Once encrypted, the second session key may be transmitted to the SPM 120 at step 266.

At step 269, the SPM 120 may receive the encrypted second session key from the POS server 170 (via the controller electronics 155). Once received, the SPM 120 may decrypt the second session key using the SPM's 120 private key at step 272. After the second session key is decrypted, it may be stored locally by the SPM 120 with the set of stored keys 140 at step 275. Similar to the POS server 170 in step 260, the second session key may immediately overwrite the stored first session key. In other instances, however, the first session key may be kept after storing the second session key until communications using the first session key are complete. Thus, no interruption of service may be caused by updating the session key. Further communication between the POS server 170 and the SPM 120 may then be performed by encrypting sensitive data with the second session key until another session is generated by die POS server 170 in accordance with the rules of system 100. As discussed above, periodic refreshing of the session key provides protection against tampering because even where the current session key has been compromised, upon generation and propagation of a new session key, security may be reestablished.

Figure 3:
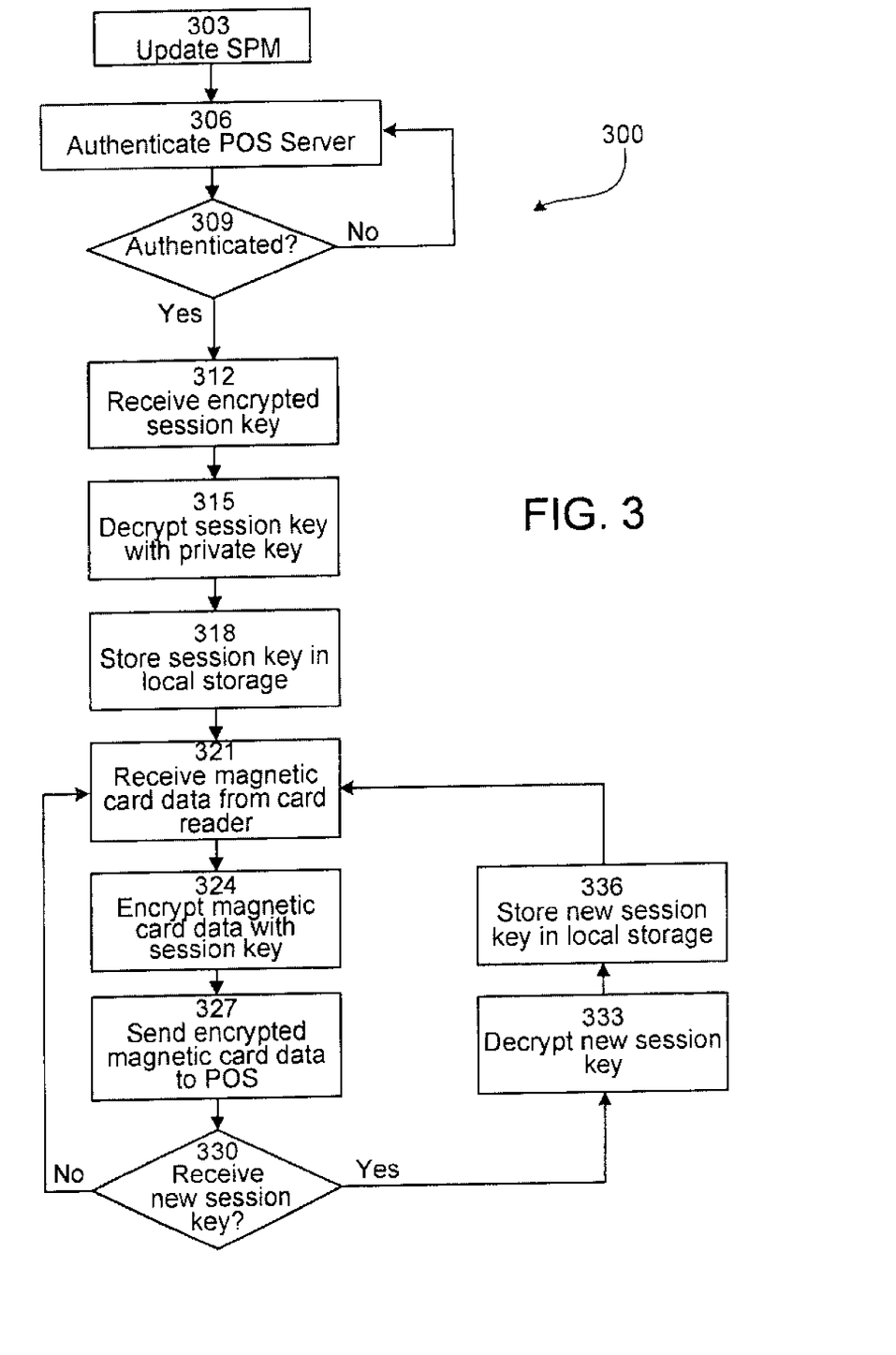
FIG. 3 is a flowchart diagram illustrating one embodiment of a process for providing secure communications between the SPM and POS of the illustrated embodiment of FIG. 1, as viewed from the perspective of the SPM.

FIG. 3 provides a flowchart illustrating the process 300 that occurs during operations within system 100 of FIG. 1 as viewed from the perspective of the SPM 120. In some instances, the retail environment 105 may initially be using another method than those of the present disclosure to secure communications between the SPM 120 and POS server 170. In those instances, the SPM 120 may need to be updated in order to perform the operations implementing the processes of system 100 described in FIGS. 1-4. Updates to SPM 120 may be performed by any suitable methods, including through the transmission of software updates to the controller electronics 155, which may modify the software of the electronics 155 controlling the SPM 120. In other instances, manual updates by the operator of the retail environment 105 may be used to update the SPM 120, such as physically entering the retail environment 105 to install the specific data and programs onto the controller electronics 155 and SPM 120. The update may include supplying the SPM 120 with the public key certificate 135 and the related private key issued by the CA. Regardless of the update method, the SIM 120 may receive the cryptographic information to be used in securing communications and the controller electronics 155 may be updated to operate according to the present disclosure.

Once the SPM 120 is updated, process 300 continues to step 306 where the SPM 120 may attempt to authenticate the POS server 170. As described at step 212 of FIG. 2A, authentication may be performed by a number of common methods. Regardless of the method implemented, at step 309 the SPM 120 determines whether the POS server 170 is successfully authenticated. If authentication fails, process 300 returns to step 306 and makes additional attempts to authenticate the POS server 170. In some embodiments, after a pre-determined number of authentication failures, the SPM 120 may stop attempting to authenticate the POS server 170. In other embodiments, the SPM 120 (via the controller electronics 155 monitoring the authentication process) may generate an error message indicating the continuing failure of the authentication process and provide it to an end-user or operator.

If the SPM 120 successfully authenticates the POS server 170, then process 300 continues to step 312, where the SPM 120 receives an encrypted session key from the POS server 170 and encrypts the session key with the public key associated with the SPM's 120 public key certificate 135. The encrypted session key may be received through the communication line 145 between the SPM 120 and the controller electronics 155 even though the POS server 170 may have initially delivered the encrypted key to the controller electronics 155. Upon receipt of the session key, the SPM 120 may use the private key securely located with the other stored keys 140 to decrypt the message at step 315. Once the session key is decrypted, at step 318 it may be stored locally with the other keys 140 for the encryption and decryption of magnetic card data Having stored the session key locally, the SPM 120 may wait for a customer transaction to occur at the card reader 110. At step 321, the SPM 120 receives magnetic card data from the card reader 110 over communication line 115. In some instances, information sent from the card reader 110 may be encrypted such that the information may need to be decrypted by the SPM 120 prior to continuing with process 300. In those instances, the SPM 120 may use the corresponding key to decrypt the magnetic card data. Once the magnetic card data is in clear form, the SPM 120 may encrypt the magnetic card data with the session key at step 324. At step 327, the SPM 120 sends the encrypted magnetic card data to the POS server 170.

As described in FIGS. 2A and B, the POS server 170 may generate new session keys periodically in order to better ensure the security of communications within the system 100. Therefore, at step 330 the SPM 120 may determine whether a new encrypted session key has been received from the POS server 170. If no new session key is received, process 300 may return to step 321, and additional magnetic card data may be received from the card reader 110 for other customer transactions. If a new session key encrypted with the SPM's 120 public key has been received, the process 300 moves to step 333, where the new session key is decrypted using the corresponding private key. Once decrypted, the new session key may be stored within the set of stored keys 140 maintained at memory 130 at step 336. In some instances, the old session key may be immediately overwritten to avoid concurrent storage of multiple session keys. However, in other instances, some communications between the POS server 170 and the SPM 120 may still be using the old session key for encryption. In those situations, the old session key may remain in the set of stored keys 140 until its use has been phased out of the system 100. Once the new session key has been stored at step 336, process 300 returns to step 321 where the SPM 120 receives data from the card reader 110. From that step forward, the SPM 120 may use the new session key to encrypt sensitive information being sent to the POS server 170 until a newer session key is received.

Figure 4:
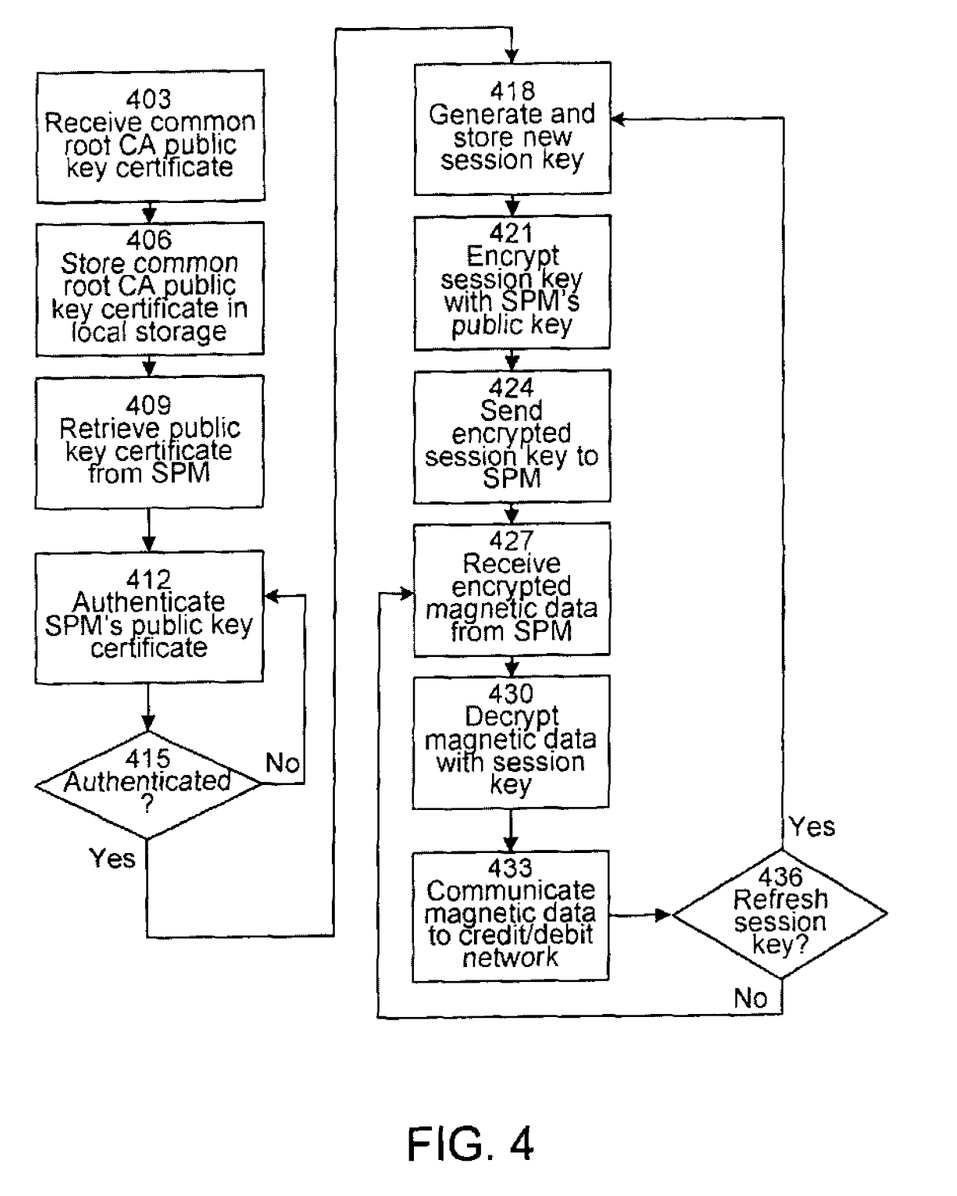
FIG. 4 is a flowchart diagram illustrating one embodiment of a process for providing secure communications between the SPM and the POS of the illustrated embodiment of FIG. 1, as viewed from the perspective of the POS.

FIG. 4 is a flowchart illustrating the process 400 that occurs during operation of the system 100 as viewed from the perspective of the POS server 170. In order to securely communicate with the SPM 120, the POS server 170 may need to perform several preliminary steps. At step 403, the POS server 170 may receive a copy of the Root CA public key certificate 180. In other embodiments, the certificate 180 may instead be issued by a sub-CA that has been certified by the Root CA such that the certificate 180 is chain-authenticated to the Root CA and may be relied safely relied upon for security-based tasks. With this certificate, the POS server 170 is able to authenticate the SPM 120 and its public key certificate 135. By having a copy of the Root CA (or sub-CA) public key certificate 180, the POS server 170 may associate a level of trust with the Root CA. Thus, if other components publish certificates issued by the same CA (which include the CAs unique digital signature), then the identity of the components may be authenticated and the POS server 170 may confidently interact with them. In some instances, the copy of the Root CA (or sub-CA) public key certificate 180 may be provided to the POS server 170 by its local operator. In those situations, the certificate 180 may be provided to the local operator by the SPM's 120 manufacturer or operator who requested the SPM's certificate 135 from the CA. In some situations, one common Root CA (or sub-CA) certificate may be provided to all of the POS environments 165 implementing the new system. Thus, the manufacturer/operator may avoid having to generate multiple Root CA (or sub-CA) certificates for each POS environment 165, and the present disclosure may be enabled with a number of third parties, each using different embodiments of the retail 105 and POS environments 165. Also, the SPM 120 manufacturer/operator may avoid manually supplying each POS server 170 associated with an SPM 120 with the cryptographic information of the present disclosure. In still other instances, the certificate 180 may be provided to the POS server 170 through the server's connections with outside networks, such as the Internet or through an automated messaging service. Once received, the POS server 170 stores the certificate 180 in the memory 175 at step 406. By storing the certificate 180, the POS server 170 may retrieve the certificate 180 during authentication of the corresponding SPM 120 within the system 100.

At step 409, the POS server 170 may retrieve the public key certificate 135 from the SPM 120. Because the SPM's certificate 135 provides only the public key, the SPM 120 may freely distribute its certificate 135 to any requesting component or user. Once information is encrypted with the public key, only the private key, kept secret at the SPM 120, may decrypt the information. Standard methods of retrieving public key certificates may be implemented such that the POS server 170 receives a copy of the certificate 135. Continuing to step 412, the POS server 170 may attempt to authenticate the SPM's certificate 135 with the Root CA (or sub-CA) public key certificate 180. The authentication process is performed by comparing the digital signature included with the public key certificate 135 and the digital signature of the CA included in the Root CA (or sub-CA) public key certificate 180. Step 215 of FIG. 2A further describes authenticating the SPM 120. Those methods, as well as other commonly known methods, may be used to perform the authentication at step 412. At step 415, process 400 determines whether the authentication is successful. Where the SPM 120 is authenticated, the process 400 may continue to step 418. If the SPM 120 cannot be authenticated, however, the process 400 returns to step 412, where the POS server 170 attempts to authenticate the SPM 120 again. In some embodiments, the POS server 170 may stop attempting to authenticate the SPM 120 after a pre-determined number of attempts or time has passed. Similar to step 306 of FIG. 3, the POS server 170 may generate an error message that may be sent to the end-user or operator at the POS environment 165 notifying them of the continued failures. In some cases, the POS server 170 may send a message to the retail environment 105 notifying the controller electronics 155 and, in effect, its operators, that the SPM 120 could not be authenticated.

Returning to step 418, the POS server 170 may generate a new session key once the SPM 120 has been authenticated. As described, no special session key generation algorithm is required. The SPM 120 does not need to know how the session key is generated, and the session key is to be kept private at POS server 170 and encrypted by the SPM's 120 public key when transmitted. In some instances, no additional hardware may be necessary at the POS server 170 in order to generate the new session key. To provide the highest level of security. A session key should be randomly generated. The POS server 170 may use random numbers provided by an RNS while in other cases it may employ a PRNG using system entropy to create a pseudorandom session key. Other methods of generating a random session key may also be used at step 418. At step 421, the new session key, regardless of how it is generated, may be encrypted with the public key retrieved from the SPM's 120 public key certificate 135. Once encrypted, the POS server 170 may send the encrypted key to the SPM 120 (via the controller electronics 155) at step 424. Thus, the session key, even if intercepted by an unauthorized party, may only be decrypted using the corresponding private key at the SPM 120.

Once the session key has been sent to the SPM 120, the POS server 170 may wait until it receives a set of magnetic card data, encrypted with the new session key generated by the POS server 170, from the SPM 120 at step 427. Then, at step 430, the POS server 170 may decrypt the data with the session key. Once decrypted, the data may be communicated to the credit/debit network 190 for authorization at step 433 if it represents payment information. In situations where the information is for identification purposes, the POS server 170 may authorize the identification data with the corresponding network or entity through an alternate connection.

At step 436, process 400 determines whether the session key should be refreshed. Session key refreshment may be determined based on conditions set at the POS server 170. For instance, after a certain number of transactions or a predefined amount of time, the POS server 170 may be configured to generate a new session key to replace the older session key in use. By refreshing the session key, security is ensured on a regular basis. Also, if the old session key has somehow been intercepted, generating a new session key may allow for secure communications to be reestablished. Thus, if the conditions for a new session key are met, then the process 400 may return to step 418, and the new session key may be generated. When the new session key is stored at step 418, the old session key may be overwritten. However, in some instances the old key may be kept until all communications using it have terminated. Therefore, any current messages using the old session key may be encrypted or decrypted at the POS server 170. Once the old session key has been phased out from active communications, it may be removed from the set of stored keys 195. Process 400 may then return to step 418 and continue the relevant steps of process 400, including providing the new session key to the SPM 120, in order to keep the communications between the SPM 120 and the POS server 170 secure. In situations where the session key is not refreshed, process 400 returns to step 427, where the POS server 170 continues to receive encrypted data from the SPM 120. The POS server 170 may continue decrypting the information with the old session key until conditions indicate that a new session key should be generated.

While the preceding flowcharts and accompanying descriptions illustrate exemplary processes 200, 300, and 400, the system 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the system 100 may use methods with additional steps, fewer steps, and/or different steps, so long as the process remains appropriate.

Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alteration are also possible without departing from the spirit and scope of this disclosure, and such changes, substitutions, and alterations may be included within the scope of the claims included herewith.

The invention claimed is:

1. A system for secure communication in a fueling environment, comprising:
a first dispenser environment, the first dispenser environment comprising:
a first secure payment module (SPM) in a first fuel dispenser coupled to a first card reader, the first SPM storing a first public key certificate issued by a trusted certificate authority to uniquely identify the first SPM, and a first private key associated with the first public key certificate; and
a point-of-sale (POS) environment, the POS environment comprising a first POS server communicably coupled to the first SPM, the first POS server storing a third public key certificate issued by the trusted certificate authority, wherein the POS server is configured to:
dynamically generate a first session key for communication with the first SPM;
encrypt the first session key using, at least in part a first public key included in the first public key certificate; and
transmit the encrypted first session key to the first SPM;
wherein the first SPM is configured to:
receive the encrypted first session key from the POS server;
decrypt the first session key using, at least in part, the first private key;
after receiving the encrypted first session key and decrypting the first session key, receive a first set of magnetic card data from the first card reader;
encrypt the first set of magnetic card data using, at least in part, the first session key; and
transmit the encrypted first set of magnetic card data to the POS server.

2. The system of claim 1, wherein the POS server is further configured to:
receive the encrypted first set of magnetic card data from the first SPM; and
decrypt the first set of magnetic card data using, at least in part, the first session key.

3. The system of claim 2, wherein the POS server is further configured to send the decrypted first set of magnetic card data to the first authorization network communicably coupled to the POS server, wherein the first authorization network is configured to authorize the first set of magnetic card data.

4. The system of claim 2, wherein the POS server is further configured to authenticate the first SPM, wherein to authenticate the first SPM the POS server is further configured to:
retrieve a first digital signature from the first public key certificate, wherein the first digital signature is embedded in the first public key certificate;
retrieve a second digital signature from the third public key certificate, wherein the second digital signature is embedded in the third public key certificate, the second digital signature unique to the trust certificate authority; and
compare the first digital signature with the second digital signature.

5. The system of claim 1, wherein the first session key is a pseudorandom key configured to be dynamically generated by the POS server using system entropy.

6. The system of claim 1, wherein the coupling between the first SPM and the first card reader is physically secured in a tamper-resistant enclosure.

7. The system of claim 1, wherein the first dispenser environment further comprises a second SPM in a second fuel dispenser coupled to a second card reader, the second SPM storing a second public key certificate issued by the trusted certificate authority to uniquely identify the second SPM, and a second private key associated with the second public key certificate;
the first POS server is communicably coupled to the second SPM;
the POS server is configured to
dynamically generate a second session key for communication with the second SPM,
encrypt the second session key using, at least in part, a second public key included in the second public key certificate, and
transmit the encrypted second session key to the second SPM;
the second SPM is configured to:
receive the encrypted second session key from the POS server,
decrypt the second session key using, at least in part, the second private key,
receive a second set of magnetic card data from the second card reader,
encrypt the second set of magnetic card data using, at least in part, the second session key, and
transmit the encrypted second set of magnetic card data to the POS server.

8. The system of claim 7, wherein the second session key is a pseudorandom key configured to be dynamically generated by the POS server using system entropy.

9. The system of claim 7, wherein the second SPM receives the second set of magnetic card data after the second SPM receives the encrypted second session key and decrypts the second session key.

10. The system of claim 7, wherein the POS server is further configured to:
receive the encrypted third set of magnetic card data from the second SPM; and
decrypt the second set of magnetic card data using, at least in part, the second session key.

11. The system of claim 10, wherein the POS server is further configured to authenticate the second SPM, wherein to authenticate the second SPM the POS server is further configured to:
- retrieve a third digital signature from the second public key certificate, wherein the third digital signature is embedded in the second public key certificate; and
- compare the third digital signature with the second digital signature.

* * * * *